United States Patent [19]

Foss

[11] 3,720,121

[45] March 13, 1973

[54] FIBERGLASS PIPE WORKING TOOL

[75] Inventor: Rudolph G. Foss, Tulsa, Okla.

[73] Assignee: Unique Industries, Inc., Tulsa, Okla.

[22] Filed: Feb. 10, 1971

[21] Appl. No.: 114,191

[52] U.S. Cl. .................................... 82/4 C, 144/205
[51] Int. Cl. ............................................. B23b 5/16
[58] Field of Search ......................... 82/4 C; 144/205

[56] References Cited

UNITED STATES PATENTS 2,348,186   5/1944   Bashore ................................ 82/4 C Primary Examiner—Francis S. Husar
Attorney—Head & Johnson

[57] ABSTRACT

A tool for putting a male taper on the end of a length of pipe includes a supporting member which rotatably carries an expandable collet and pivotally carries a cutter blade assembly having a cutter blade thereof extending directly above the expandable collet. A combination handle and blade advancer is utilized to rotate the cutter blade relative to a length of pipe received over the collet and at preselected intervals to advance the blade onto the outer wall of the pipe to obtain the desired angle and length of taper.

4 Claims, 5 Drawing Figures

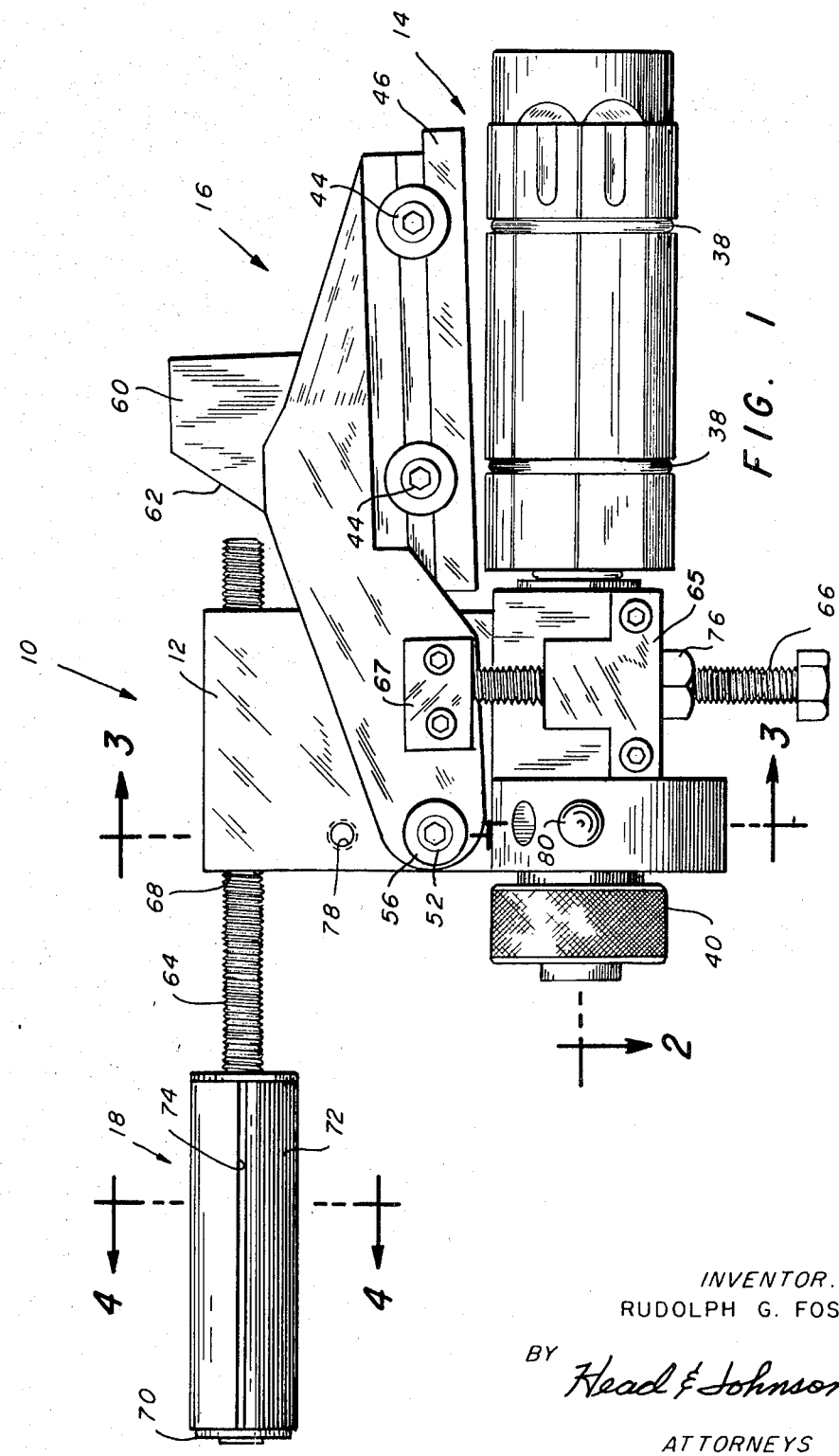

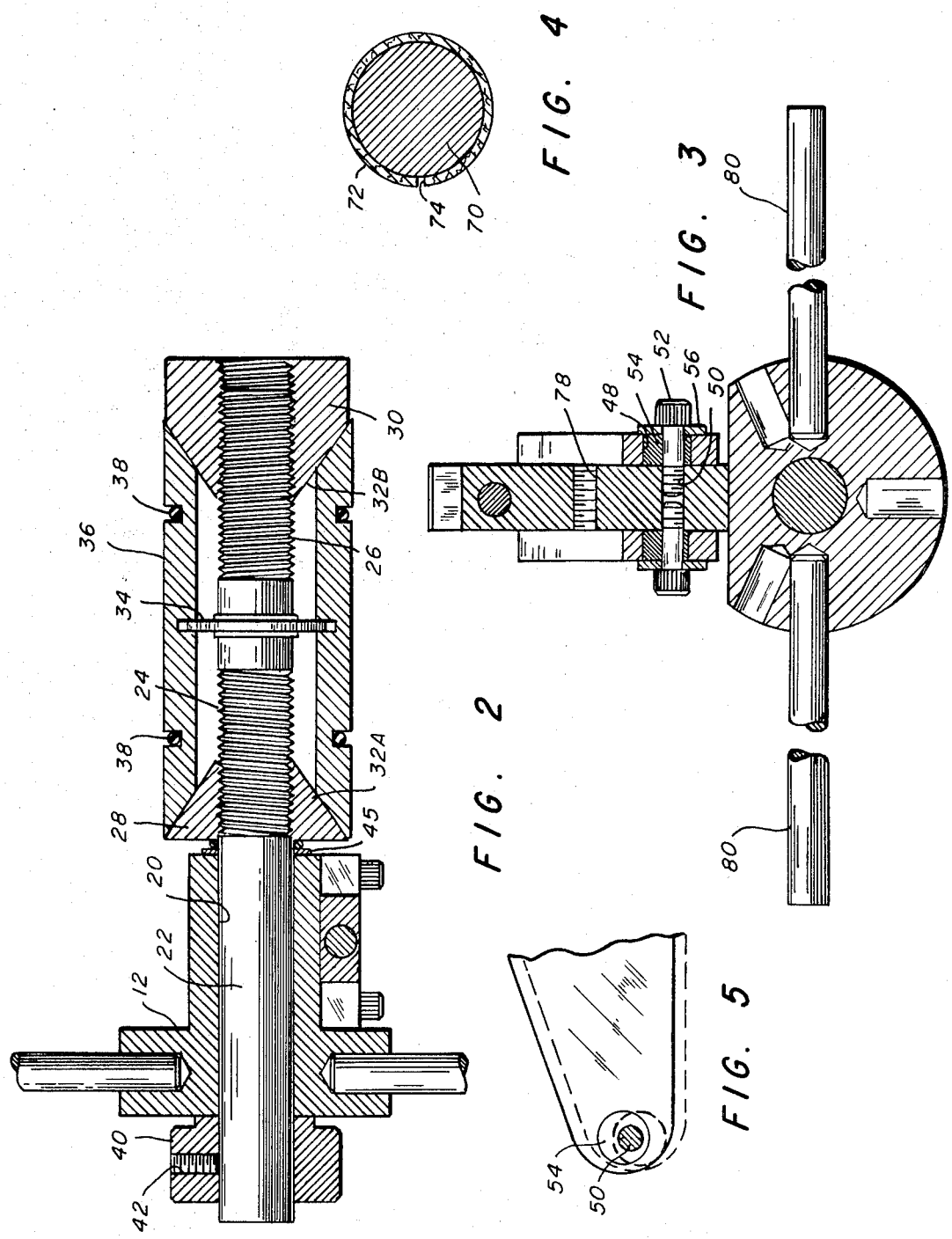

3,720,121

FIBERGLASS PIPE WORKING TOOL

BACKGROUND OF THE INVENTION

This invention relates to tapering tools, and more particularly to tapering tools for putting a male taper on the end of a tubular article.

Pipe tapering tools have heretofore been manufactured and generally comprise a collet or mandrel to which is attached a head member perpendicular to and rotatable about the axis of the collet. The head member carries an elongated cutting blade substantially parallel to the collet. In operation, the end of the tubular object such as fiberglass pipe which is to be tapered is inserted over the collet and the collet expanded such that it comes in contact with the inner wall of the pipe. The head portion of the tool is then rotated relative to the collet to enable the cutter blade to cut a male taper in the exterior wall of the pipe. During the cutting operation, the blade is progressively advanced onto the wall of the pipe to attain the correct angle of cut and length of taper desired.

Presently manufactured pipe and tapering tools generally fall into two categories. The first category comprises relatively simple cutting tools which are designed to be used on a single size pipe and which have very limited adjustability as to the angle of cut. The second category of pipe tapering tools are larger, more expensive tools which incorporate various accessory features such as an expandable collet to enable one tool to be used on various diameter pipe. Also the larger models have means thereon for varying the angle of cut thereby increasing the utility of the device.

These larger, more sophisticated tools have the disadvantages of being expensive and not being usable in close, inaccessible quarters. The smaller single size tools on the other hand lack needed utility.

It is therefore on object of this invention to present a tapering tool which is small and inexpensive, but incorporates therein accessory features which heretofore have been limited to larger size tools.

It is a second object of this invention to present a small, lightweight, inexpensive tapering tool having an expandable collet and an adjustable angle cutting blade assembly.

SUMMARY

Generally the apparatus incorporates a supporting member which rotatably carries an expandable collet pivotally. Pivotally coupled to the supporting member and projecting outwardly therefrom directly above the expandable collet is a cutting blade assembly. A combination rotating handle and cutting blade advancer includes a threaded shank which threadably passes through the supporting member and which projects forwardly therefrom to abut against the cutting blade assembly. During operating the handle is used to rotate the blade relative to a tubular article received on the expandable collet and at desired intervals the cutter blade is advanced onto the outer wall of the pipe by a tightly clinching of the handle.

DETAILED DESCRIPTION OF THE DRAWINGS

FIG. 1 of the drawings is a side view of the fiberglass pipe working tool of this invention.

FIG. 2 is a cross-sectional view of the apparatus taken along the lines 2—2 of FIG. 1.

FIG. 3 of the drawing is a cross-sectional view of the apparatus of this invention taken along lines 3—3 of FIG. 1.

FIG. 4 is a cross-sectional view of the apparatus taken along the lines 4—4 of FIG. 1.

FIG. 5 is a partial view of the apparatus showing the operation of an eccentric cam element.

DETAILED DESCRIPTION OF THE PREFERRED EMBODIMENT

Referring now to the side view of FIG. 1, the fiberglass pipe working tool of this invention generally denoted as the numeral 10 includes generally a supporting member 12 which rotatably carries a collet 14, a cutter blade assembly 16, and rotating means 18 which rotates the cutter blade assembly 16 relative to the collet 14.

Referring now to FIG. 2, supporting member 12 which may be fabricated of light weight material, such as for example aluminum, has in the lower portion thereof an elongated aperture 20 which rotatably carries a collet shaft 22. Collet shaft 22 extends exteriorly forwardly from supporting member 12 and contains along the length thereof left hand threads 24 and spaced apart therefrom right hand threads 26. Received on both left hand and right hand threads 24 and 26 respectively, are tubular collet expanding bushings or cones 28 and 30. Each of the expanding bushings 28 and 30 has inwardly and downwardly tapered confronting surfaces 32A and 32B around the periphery thereof. Collet 14 is sleeved over collet shaft 22 and the inner wall thereof has outwardly and upwardly inclined surfaces at each end thereof mating with the inwardly and downwardly tapered surfaces 32A and 32B of the expander bushings. Collet 14 is centered between the respective expander bushings by means of a centering ring 34 having an inner diameter affixed to shaft 22, and an outer periphery received within an annular recess within the inner wall of the collet.

Collet 14 is comprised of a plurality of longitudinal arcuate-in-cross section bars 36 held in a cylindrical configuration by elastic means such as O-rings 38.

The OD of collet 14 is slightly smaller than the ID of a certain size of pipe. In order to make a single tool adaptable for use on different size OD pipe, collets of larger OD are progressively sleeved one over the other to enlarge the OD of the composite collets to a dimension slightly less than the diameter of the pipe being tapered, as is specifically taught and discussed in my copending patent application entitled, "Tapering Tool For Fiberglass Pipe," dated Aug. 13, 1970 Ser. No. 63,366, now U.S. Pat. No. 3,683,725.

A knurled knob 40 received over the rearward end of collet shaft 22 and secured thereon by means of set screw 42 provides means for manually rotating the collet shaft. Rotation of the collet shaft 22 causes expander bushings 28 and 30 to longitudinally travel on the shaft to either effect expansion or contraction of the collet depending upon the direction of rotation of the shaft. The portion of the collet shaft 22 passing through aperture 20 is polished and lubricated to aid in frictionless rotation of the shaft. To prevent the entrance of dust or other contaminants, a washer and O-ring seal arrangement 45 is sleeved over the collet shaft intermediate expander bushing 28 and the forward edge of supporting 12.

Referring now back to FIG. 1, cutter blade assembly 16 may be of the same light weight material as supporting member 12 and has a rearwardly extending fork portion 66 which is inserted over support member 12. Adjacent each of the rearward ends thereof fork portion 66 contains an oversize transverse aperture 48 which is in registered alignment with a tapped hole 50 in support member 12. A threaded bolt 52 threadably engaging hole 50 pivotally attaches the cutter blade assembly to support member 12. As is shown in FIG. 3, each of the oversized apertures 48 has a diameter considerably greater than that of bolt 70 and has received therein an eccentric cam 54. A washer 56 retains the cam in aperture 48. Tapped hole 50 and bolt 70 is merely one of a variety of methods of pivotally securing cutter blade assembly 16 to support member 12. Obviously a single bolt passing through the aligned apertures and terminating with a nut would also suffice as an attaching means. Eccentric cam 54 compensates for the variance in the OD of different size fiberglass pipe to enable the correct angle of taper to be attained in each cutting operation. That is, for one size pipe the cam is seated as is shown in solid in FIG. 5, which positions the pivot point of cutter blade assembly relative to the outer wall of the pipe such that the desired angle of taper is attained. When a second larger size pipe is to be tapered, the point of pivotation relative to the outer wall of the pipe must be the same as with the smaller size pipe in order for the angle of taper to be proper. Thus cam 54 is positioned as shown by the dotted lines of FIG. 5 to move cam blade assembly 16 upwardly the required distance. When it is desired to taper a length of pipe having a diameter beyond the compensating limits of cam 54, the cutter blade assembly can be pivoted about a second transverse aperture 78 upwardly of first aperture 50 in the same manner as previously discussed with reference to aperture 50.

Affixed to the cutter blade assembly 16 directly above and adjacent to collet member 14 by means of spaced apart bolts 44 is an elongated cutting blade 46. Projecting upwardly from cutter blade assembly 16 is an abutting member 60 which has an inclined surface 52 against which is urged the forward end of a threaded shank portion 64 of rotating means 18. Shank portion 64 threadably engages a second longitudinal aperture 68 in supporting member 12 and has affixed to the rearward end thereof a handle core 70 over which is sleeved in a slip fit fashion a leather grip 72 that can best be seen in FIG. 4. Leather grip 72 contains an elongated slit 74 extending the entire length thereof. Handle core 70 is smooth and polished so as to allow grip 70 to rotate freely thereon. Thus with light pressure applied thereto grip 72 will rotate relative to handle core 58. However, when squeezed tightly, the grip and handle core and consequently the shank portion 64 will rotate in unison.

Referring now back to FIG. 1, appropriately attached to the lower end of the support member 12 is a threaded block nut 65 which threadably receives a restraining screw 66 which passes through block nut 65 to engage a stopper block 67 suitably secured to the cutting assembly 16. Restraining screw 66 and stopper block 68 provide a convenient method for adjustably prohibiting the further downwardly pivotal movement of the cutting blade assembly at a preselected form. To lock restraining screw in its preselected position, nut 76 may be threadedly received thereon and compressed against thread block nut 65 as is shown on the drawings.

In operation the tubular end of a length of fiberglass pipe or other article to be tapered is sleeved over collet 14 and collet 14 is expanded by rotation of collet shaft 22 until the collet surface grips the inner wall of the pipe to support and carry the pipe thereby preventing damage thereto during the cutting operation.

Cutter blade 46 is then advanced onto the outer wall of the pipe by rotation of shank portion 64 which by urging against abutment member 60 forces cutter blade assembly 16 through an arcuate distance.

An operator, lightly gripping leather grip 72, imparts rotative movement to support member 12, cutter blade assembly 16 and cutter blade 46 relative to the pipe to cause blade 46 to cut a male taper therein. Concurrently with the rotation of the support member, at intermittent intervals, the operator tightly squeezes leather grip 72 to cause rotation of shank 64 which progresses forwardly to further urge against abutment member 60 thereby progressively advancing the cutter blade onto the outer wall of the pipe until restraining screw 66 encounters stopper block 67 at which time the tapering operation is completed and the pipe can be removed. As before-mentioned, when a pipe of a different OD than the previous tapered pipe is inserted over the collet, eccentric cam 54 can be positioned to move the cutter blade assembly slightly upwardly or downwardly to assure that the correct angle of cut would be obtained. Auxiliary handles 80 may be utilized for added leverage when large diameter pipe is to be tapered.

In the detailed description of the preferred embodiment, specific language has been made for the sake of clarity. However, it is to be understood that the language used are not words of limitation but include all equivalents which operate in a similar manner to function a similar purpose.

What is claimed:

1. An apparatus for tapering the end of a tubular article comprising:
   a supporting member having a longitudinal threaded aperture;
   a collet for receiving the end of a tubular article rotatably carried by and projecting outwardly from said supporting member;
   a cutter blade assembly pivotally secured to said supporting member and projecting therefrom outwardly of said collet;
   a cutter blade affixed to said cutter blade assembly adjacent said collet; and
   means for operably moving said cutter blade assembly through an arcuate distance comprising:
   an abutment member secured to said cutter blade assembly;
   supporting member rotating means having a threaded shank portion threadedly engaging and extending forwardly from said aperture in said supporting member, the forward end of said shank being abuttable with said abutment member;
   gripping means slip-fitted over the rearward end of said shank portion; said gripping means being operably squeezable whereby concurrently with rotation of said supporting member relative to said tubular member received over said collet said shank portion can be advanced to force said cutter blade assembly to move through an arcuate distance to cause said blade to progressively engage the outer wall of said tubular article.

2. An apparatus as in claim 1 wherein said pivotal attachment of said cutter blade assembly includes cam means for operably compensating for variances in diameter of different tubular articles.

3. An apparatus as in claim 1 wherein said gripping means comprises cylindrical shaped leather material having along the longitudinal length thereof an elongated slot.

4. An apparatus as in claim 1 including a stop mechanism for prohibiting at preselected points the progressive advancement of said blade onto the outer wall of said tubular article received on said collet.

* * * * *